United States Patent [19]

Nozawa et al.

[11] 4,298,262
[45] Nov. 3, 1981

[54] APERTURE DEVICE OF A LENS CAPABLE OF CLOSE PROXIMITY FLASH PHOTOGRAPHY

[75] Inventors: Hideyo Nozawa, Ohmiya; Hideshi Naito, Tokyo, both of Japan

[73] Assignee: Nippon Kogaku K.K., Tokyo, Japan

[21] Appl. No.: 181,978

[22] Filed: Aug. 28, 1980

[30] Foreign Application Priority Data

Sep. 14, 1979 [JP] Japan .................................. 54/117322

[51] Int. Cl.³ .................. G03B 15/03; G03B 3/00; G02B 7/02
[52] U.S. Cl. .................................. 354/139; 350/255; 354/196
[58] Field of Search ................. 354/139, 149, 196, 46, 354/47, 272, 274; 350/255

[56] References Cited

U.S. PATENT DOCUMENTS

| | | | |
|---|---|---|---|
| 3,447,441 | 6/1969 | Ort | 354/196 |
| 3,680,459 | 8/1972 | Okura | 354/196 |
| 3,841,735 | 10/1974 | Katagiri et al. | 350/255 X |
| 3,851,952 | 12/1974 | Werz et al. | 350/255 X |
| 4,034,387 | 7/1977 | Ohtaki et al. | 354/139 X |

FOREIGN PATENT DOCUMENTS

1422728 10/1960 Fed. Rep. of Germany ...... 354/196

*Primary Examiner*—Donald A. Griffin
*Attorney, Agent, or Firm*—Shapiro and Shapiro

[57] ABSTRACT

A lens includes a flash unit including a ring-shaped irradiating light source disposed around the lens barrel symmetrically about the optical axis, a diaphragm for varying the aperture diameter, an optical system having a first focusing mode in which focusing operation can be effected with respect to an object lying within a predetermined distance range and second focusing mode in which focusing operation can be effected with respect to an object lying at a distance shorter than said predetermined distance range, a control device for varying the aperture diameter in accordance with the focusing operation when said optical system is in the first focusing mode, and a device for holding the aperture diameter in the vicinity of its minimum diameter for the focusing operation when said optical system is in the second focusing mode.

8 Claims, 10 Drawing Figures

APERTURE DEVICE OF A LENS CAPABLE OF CLOSE PROXIMITY FLASH PHOTOGRAPHY

BACKGROUND OF THE INVENTION

1. Field of the Invention

This invention relates to an aperture device of a lens capable of photographing an object at close proximity by the use of a flash unit, particularly an electric flash unit.

2. Description of the Prior Art

When an electronic flash unit is used as an object illuminating light source, if the spacing between the optical axis of the phototaking lens of the camera and the flash unit comes near the object, the light distributing characteristic of the flash unit exerts a very strong influence upon the illumination of the object and thus, it has been impossible to effect uniform illumination. As a technique of solving this problem, it has been adopted to mount a ring-shaped xenon tube of the flash unit around the end of the lens and thereby illuminate an object at proximity.

Generally, where auxiliary illumination photography is to be effected with an object illuminated by an electronic flash unit, such auxiliary light photography is carried by varying the aperture value of the camera in accordance with the object distance so that the total quantity of emitted light inherent to the flash unit, namely, the quantity of emitted light usually called the guide number for ASA 100, becomes equal to the product of the distance to the object and the aperture opening value of the camera. However, when the position of the camera is very close to the object, the distance to the object is very small and therefore, a proper exposure cannot be obtained unless an aperture opening equal to or less than the minimum aperture value that can be adjusted by the aperture device of the camera is provided. Accordingly, with such system, proximity photography has been impossible.

SUMMARY OF THE INVENTION

It is the object of the present invention to provide a lens which is capable of photographing an object at close proximity and in which proper exposure can be easily obtained under uniform illumination.

The lens of the present invention which achieves the above object includes a flash unit including, for example, a ring-shaped irradiating light source disposed around the lens barrel symmetrically about the optical axis, a diaphragm for varying the aperture diameter, an optical system having a first focusing mode in which focusing operation can be effected with respect to an object lying within a predetermined distance range and a second focusing mode in which focusing opertion can be effected with respect to an object lying at a distance shorter than said predetermined distance range, a control device for varying the aperture diameter in accordance with the focusing operation when said optical system is in the first focusing mode, and a device for holding the aperture diameter in the vicinity of its minimum diameter for the focusing operation when said optical system is in the second focusing mode.

The control device varies the aperture diameter so as to satisfy the relation of an equation $GN = D.F$, where $GN$ is the quantity of light emitted from the flash unit, $D$ is the distance to the object and $F$ is the effective F-number.

The lens of the present invention thus constructed is based on the following principle. The illumination by an illuminating light source provided around the lens barrel, when the object has come very near, illuminates the object in a ring-like fashion or symmetrically about the optical axis, thus reducing the intensity of illumination of the central portion of the object as compared with that around the object. Accordingly, when the object distance exceeds a certain critical value and becomes a close proximity range (for example, 0.15 m–0.08 m), the intensity of illumination of the central portion of the object gradually decreases as the object distance becomes shorter than that. It has been experimentally found that if said first focusing mode and said second focusing mode are set with this critical value as the boundary and if, in the second focusing mode, the aperture opening is fixed at a predetermined value in the vicinity of the minimum diameter, substantially proper exposure can always be obtained for any variation in the object distance. The aperture value fixed at the predetermined value may correspond to the minimum aperture opening or may correspond to other than the minimum aperture opening, because the selection of this aperture value can be arbitrarily changed by the relation between the quantity of light emitted from the flash unit and the manner of setting the close proximity range. In selecting this aperture value, if the aperture opening is too small, the exposure will be adversely affected by diffraction or other cause and therefore, the best value must be empirically derived.

The invention will become more fully apparent from the following detailed description thereof taken in conjunction with the accompanying drawings.

DESCRIPTION OF THE PREFERRED EMBODIMENTS

Figure 1:
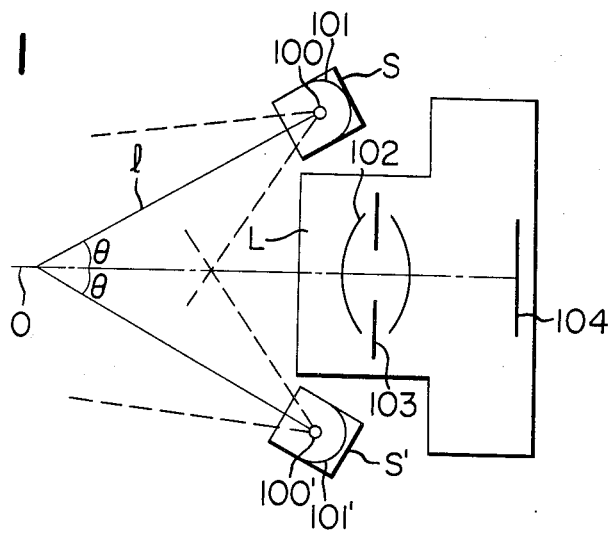
FIG. 1 schematically illustrates a flash photographing device.

The principle of the present invention will be described with reference to FIG. 1. Flash units S and S' are disposed in a ring-like fashion on the opposite sides of the lens barrel L of a camera or around the lens barrel L. The object illuminating light from the light sources 100 and 100' of the flash units S and S' is projected toward an object directly or through reflectors 101 and 101'. The light reflected by the object reaches a film surface 104 through a lens 102 and a diaphragm 103. The optical axes l and l' of the light sources 100 and 100' are inclined by θ with respect to the optical axis θ of the lens 102. The flash units emit flashlight at a predetermined emission angle as indicated by broken line in the drawing.

Figure 2:
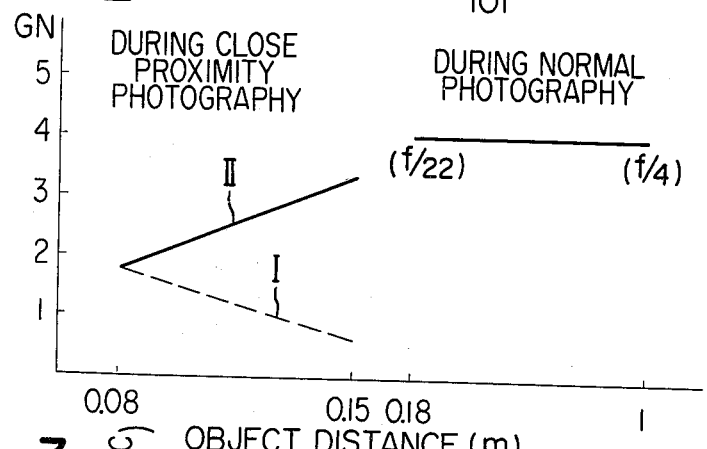
FIG. 2 is a graph illustrating the relation between the object distance and the guide number of the flash unit.

FIG. 2 shows the object distance (D) and the guide numbers (GN) of the flash units when the aperture value (F) of a phototaking lens is f/4−f/22 and the film speed is ASA100. During normal photograhy, namely, during other than close proximity photography, as already described, the focusing device and aperture device in the lens barrel may be constructed so that the quantity of light emitted from the flash units is made constant and the aperture value is changed in accordance with the object distance. Now, assuming that during photography, the object distance has become a close proximity range of 0.08 m–0.15 m, the quantity of light emitted from the flash units must be automatically controlled as indicated by the broken line I in FIG. 2 in order to satisfy the relation that GN=F.D. However, there is a limit in reducing this quantity of emitted light. Therefore, if the aperture value is fixed to f/22, the relation between the quantity of emitted light and the object distance will become such as shown by the solid line II. If, at this time, the quantity of light emitted from the flash units is rendered the same as that during normal photography, the exposure is expected to become over-exposure, but from the nature of the ring-like light on the opposite sides of the lens barrel, there is a tendency that the light does not sufficiently go round and the central portion becomes dark as the distance to the object becomes very close. The degree thereof becomes stronger as the distance to the object becomes shorter. Therefore, even if the quantity of light emitted from the flash units remains to be constant, a substantially proper exposure value will be obtained.

Figure 3:
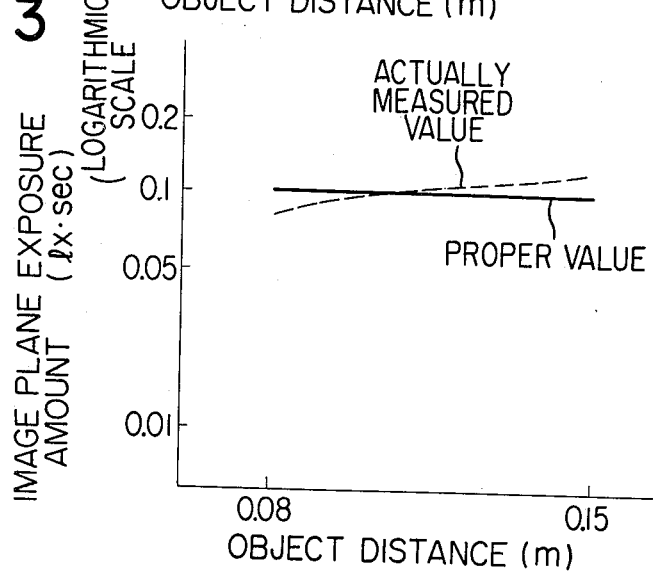
FIG. 3 is a graph showing the relation of the actually measured value to the proper amount of image plane exposure between the object distances 0.15–0.08 m with the quantity of emitted light of the flash unit being constant.

This has been confirmed by an experiment. In FIG. 3 which shows the result obtained by actually measuring the relation between the object distance and the image plane exposure amount (lx. sec.), the actually measured value for a proper image plane exposure amount has only an error of about ⅓ step (EV value) between th close proximity range object distances 0.15–0.08 m. Such degree of error is negligible in photography. The film speed at this time is ASA100.

Figure 4:
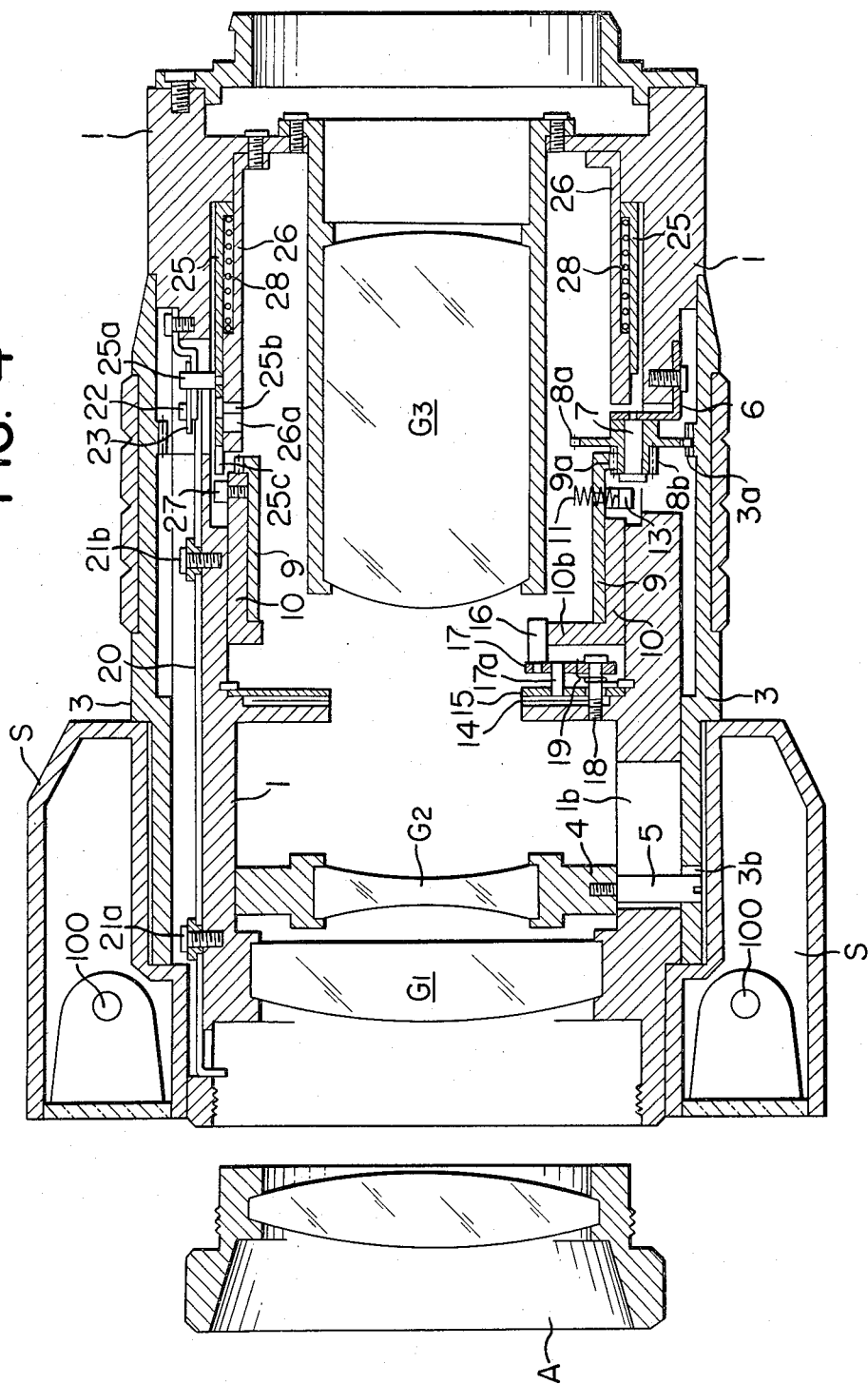
FIG. 4 is a cross-sectional view of a first embodiment of the present invention.
Figure 5:
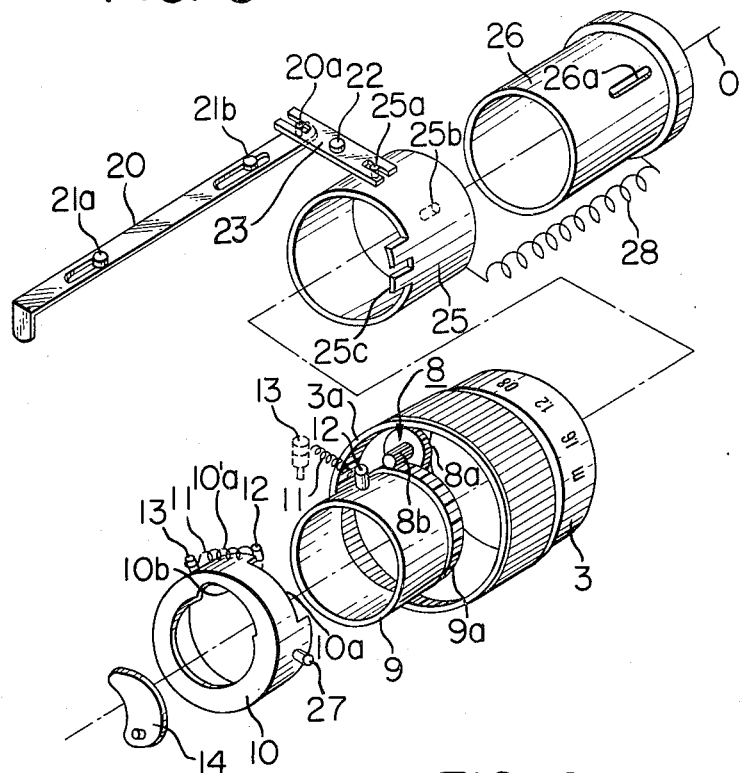
FIG. 5 is an exploded perspective view of the essential portions in FIG. 4.

The present invention will hereinafter be specifically described with respect to an embodiment thereof. Referring to FIGS. 4 and 5, a focusing ring 3 is rotatably fitted on the outer periphery of a fixed ring 1. The flash unit S having a ring-like light emitting portion 100 is mounted on the fixed ring 1 and operates during flash photography. Lenses $G_1$–$G_3$ form an internal focusing type imaging optical system which is known per se. That is, the focusing from infinity to close distance (∞ −0.18 m) can be accomplished by movement of the lens $G_2$ of this lens group in the direction of the optical axis. A pin 5 is studded in the support 4 of the movable lens $G_2$ and this pin 5 passes through a cam slot 1b provided in the fixed ring 1 and is fitted in the groove 3b of the focusing ring 3. Thus, when the focusing ring 3 is rotated, the lens $G_2$ is moved in accordance with the characteristic of the cam slot 1b to enable focusing.

Figure 6:
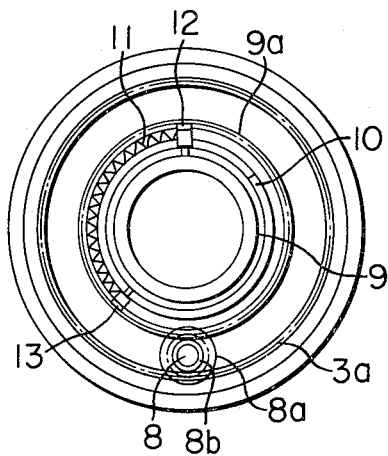
FIG. 6 illustrates the manner in which a spring 11 is hooked.

A shaft 7 is studded in a support plate 6 secured to the fixed ring 1, and a relay gear 8 is rotatably supported on this shaft 7. The large-diametered gear 8a of the relay gear 8 meshes with the internal gear 3a of the focusing ring 3, and the small-diametered gear 8b of the relay gear 8 meshes with the gear 9a of a driving ring 9. A cam ring 10 is rotatably fitted on the outer periphery of the driving ring 9. Between the driving ring 9 and the cam ring 10, a spring 11 is hooked so that the cam ring 10 rotates following the rotation of the driving ring 9. That is, as shown in detail in FIG. 6, the spring 11 hooked between the pin 13 of the cam ring 10 and the pin 12 of the driving ring 9 biases these rings 9 and 10 in a direction in which the end face 10a' of a cut-away 10a provided in the cam ring 10 bears against the pin 12. However, since various members are explodedly shown in FIG. 5, the spring 11, etc. are duplicately shown and one of them is indicated by broken line. A pin 16 provided on a lever 17 rotatable about a shaft 18 and biased by a spring 19 bears against the cam 10b of the cam ring 10. The lever 17 is provided with such a connection pin 17a that causes a ring 15 for driving an aperture blade 14 to be rotated in accordance with the rotation amount of the lever 17. This cam 10b is set so that when the focusing ring 3 has been rotated, the aperture value (F) satisfies the relation of the calculation equation of th guide numbers (GN) of the flash units namely, GN=D.F (when ASA=100), correspondingly to the object distance (D).

On the other hand, a detecting lever 20 for detecting whether or not a close-up lens A has been mounted to this interchangeable lens is supported for sliding movement in the direction of the optical axis by pins 21a and 21b. One of the forks of a seesaw lever 23 rotatably supported by a shaft 22 holds therebetween a pin 20a studded in the detecting lever 20 and the other fork holds therebetween a pin 25a studded in a control ring 25. The control ring 25 is fitted on the outer periphery of a support ring 26 fixed to the fixed ring 1. The pin 25b of the control ring 25 is received in the key slot 26a of the support ring 26 extending in the direction of the optical axis and therefore, the control ring 25 is slidable only in the direction of the optical axis. When the focusing ring 3 is adjusted to the close-up distance, the fork 25c of the control ring 25 can be moved in the direction of the optical axis to thereby hold therebetween a pin 27 studded in the cam ring 10. A spring 28 disposed between the support ring 26 and the control ring 25 biases the control ring 25 rightwardly with respect to the support ring 26 as viewed in FIGS. 4 and 5. Thus, the detecting lever 20 is biased leftwardly. Operation will now be described.

(1) During normal photography in which the object distance is ∞ −0.18 m:

In this case, the close-up lens A is not mounted and therefore, the pin 27 of the cam ring 10 is not in mesh engagement with the fork 25c of the control ring 25. Accordingly, when the focusing ring 3 is rotated counter-clockwisely (i.e. toward the infinity side), the driving ring 9 is clockwisely rotated through the agency of the relay gear 8. At this time, the cam ring 10 also rotates clockwisely because the spring 11 is hooked between the pin 12 and the pin 13. As a result, the opening formed by an aperture blade 14 is opened toward the maximum opening so as to satisfy the guide number calculaton equation. Conversely, when the focusing ring 3 is rotated clockwisely (i.e. toward the close-up distance side), the pin 12 pushes the end face 10a' of the cut-away 10a counter-clockwisely in accordance with the counter-clockwise rotation of the driving ring 9, thus closing the aperture blade 14 toward the minimum opening.

Figure 7:
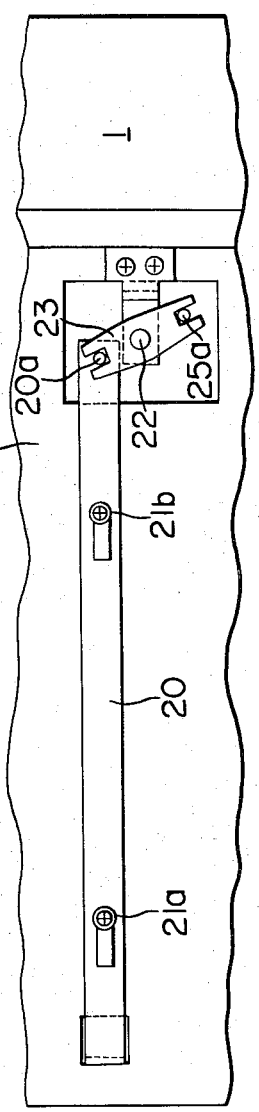
FIGS. 7 to 9 illustrate the operation of the first embodiment.
Figure 8:
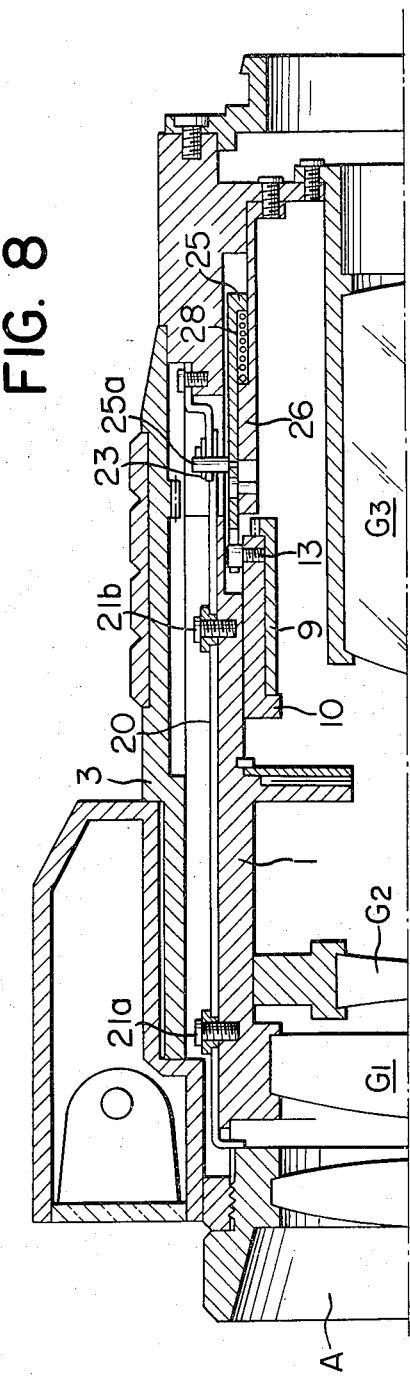
Figure 9:
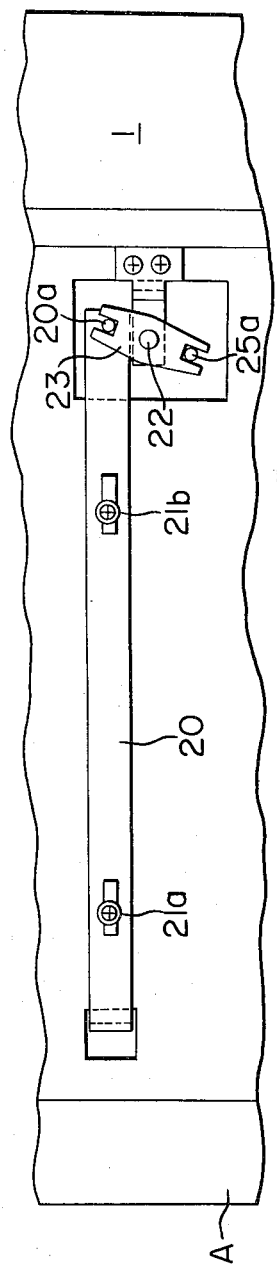

(2) When close proximity photography is effected at an object distance of 0.15–0.08 m by th close-up lens:

In this case, as a preparatory operation, the focusing ring 3 is adjusted to the close-up distance 0.18 m (at this time, the aperture blade forms the minimum aperture opening). The then conditions of the detecting lever 20 and seesaw lever 23 are shown in FIG. 7. Thereafter, the close-up lens A is mounted. When the close-up lens A is mounted, the detecting lever 20 is urged rightwardly by the body of the close-up lens as viewed in the drawing, and by clockwise rotation of the seesaw lever 23, the control ring 25 is moved leftwardly. The fork 25c comes into mesh engagement with the pin 27 of the cam ring 10. As a result, rotation of the cam ring 10 is prevented. The object distance at this time is set to 0.08 m. This condition is shown in FIGS. 8 and 9. Now, when the focusing ring 3 is rotated counter-clockwisely from this condition, the driving ring 9 is rotated clockwisely but the cam ring 10 is prevented from rotating by the fork 25c, so the pin 12 and the driving ring 9 are rotated against the force of the spring 11. Accordingly, only the focusing from the object distance 0.08 m toward 0.15 m is effected and the aperture blade remains to form the minimum opening (the maximum aperture value). The cut-away 10a is cut away more than the amount of movement of the pin 12 corresponding to the total amount of counter-clockwise rotation of the focusing ring 3.

When the rotation of the focusing ring 3 is reversed after this counter-clockwise rotation, the driving ring 9 and the pin 12 are rotated counter-clockwisely in accordance with the bias of the spring 11 and the focusing from the object distance 0.15 m toward 0.08 m is effected. Again at this time, the aperture opening is fixed at the minimum aperture.

According to the above-described construction, it is possible to carry out close proximity flash photography in which a proper exposure is obtained by the utilization of the characteristic during flash photography as shown in FIG. 3.

Figure 10:
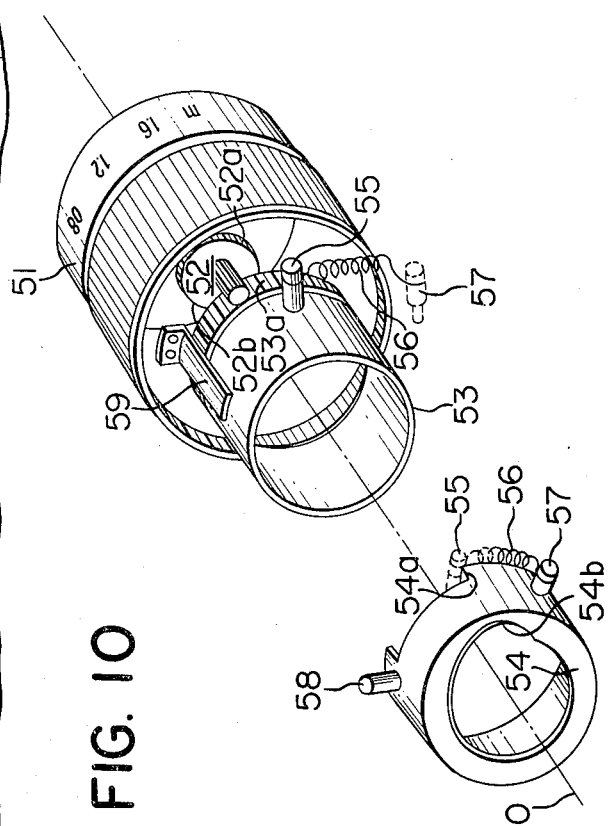
FIG. 10 is an exploded perspective view of the essential portions of a second embodiment of the present invention.

A similar device may also be adopted in a flash photography lens which can effect close proximity photography by a phototaking lens itself without mounting the close-up lens A thereto. Up to a certain phototaking distance, the aperture opening is controlled in accordance with the calculation equation of the guide number of the flash unit and, when the phototaking distance has become shorter than said certain phototaking distance, the aperture opening is fixed at the minimum aperture. From what object distance the aperture diameter is fixed may be simply determined by an experiment. FIG. 10 shows an exploded perspective view of this embodiment. A focusing ring 51 effects adjustment of the focal length toward the close-up distance side by its clockwise rotation and effects adjustment of the focal length toward the infinity side by its reverse rotation.

An internal gear 51a is provided inside of the focusing ring 51 and meshes with the large-diametered gear 52a of a relay gear 52, and the small-diametered gear 52b of the relay gear meshes with the gear 53a of a driving ring 53. A pin 55 is studded in the driving ring 53 and a pin 57 is studded in a cam ring 54 fitted on the outer periphery of the driving ring 53. The pins 55 and 57 are pulled toward each other by a spring 56, as a result of which the pin 55 is always urged against the end face of a cut-away 54a. However, for the same reason as that set forth in connection with FIG. 5, the spring 56, etc. are shown duplicately and one of them is indicated by broken line. Therefore, when the driving ring 53 is rotated clockwisely by the relay gear 52 in accordance with the rotation of the focusing ring 51, the cam ring 54 is also rotated together therewith to vary the aperture. However, as regards the counter-clockwise rotation of the driving ring 53, when it is rotated to a certain phototaking distance, a pin 58 studded in the cam ring 54 strikes against a rotation limiting plate 59 fixed to the fixed barrel. If the focusing ring 51 is further rotated, the pin 55 separates from the end face 54a against the force of the spring 56 and only the driving ring 53 rotates and the cam ring 54 does not rotate. Therefore, the focusing toward the close proximity range is effected but the aperture opening remains to be constant, namely, the minimum aperture. As in the case of FIG. 4, the pin 16 bears against the cam 54b and the aperture blade is driven as already described.

We claim:
1. In a lens barrel provided with a flash unit for irradiating an object and including a diaphragm for varying the aperture diameter and an optical system having a first focusing mode in which focusing operation can be effected with respect to an object lying within a predetermined distance range and a second focusing mode in which focusing operation can be effected with respect to an object lying at a distance shorter than said predetermined distance range, said flash unit including irradiating means disposed around said lens barrel symmetrically about the optical axis of said optical system, the improvement comprising:

control means for varying said aperture diameter in accordance with said focusing operation when said optical system is in said first focusing mode; and means for holding said aperture diameter in the vicinity of its minimum diameter with respect to said focusing operation when said optical system is in said second focusing mode.

2. A lens barrel according to claim 1, further including change-over means for changing over said optical system between said first focusing mode and said second focusing mode and wherein said holding means is operatively associated with said change-over means.

3. A lens barrel according to claim 1, wherein said control means includes a first actuating member operatively associated with said focusing operation, a second actuating member for driving said diaphragm, and a biasing member provided between said first actuating member and said second actuating member for causing said second actuating member to follow the displacement of said first actuating member, and said holding means includes means for preventing said followup of said second actuating member at a position corresponding to the critical position of said first focusing mode and said second focusing mode of said optical system.

4. A lens barrel according to claim 1, wherein said control means varies said aperture diameter so as to satisfy the relation of the following equation:

$$GN = D \cdot F$$

where
- GN: the quantity of light emitted from said irradiating means of said flash unit
- D: The distance to the object
- F: effective F-number.

5. In a lens barrel provided with a flash unit for irradiating an object and including a diaphragm for varying the aperture diameter and an optical system changeable over to a first focusing mode in which focusing operation can be effected with respect to an object lying within a predetermined distance range and a second focusing mode in which focusing operaton can be effected with respect to an object lying at a distance shorter than said predetermined distance range, said flash unit including irradiating means disposed around said lens barrel symmetrically about the optical axis of said optical system, the improvement comprising:

clutch means operable in response to said changeover operation so as to operatively associate said diaphragm and said focusing operation with each other when said optical system is in said first focusing mode and to release said operative association when said optical system is in said second focusing mode;

control means for varying said aperture diameter in accordance with said focusing operation when said optical system is in said first focusing mode; and means for holding said aperture diameter in the vicinity of its minimum diameter when said optical system is in said second focusing mode.

6. A lens barrel provided with a diaphragm for varying the aperture diameter and a flash unit for irradiating an object, said flash unit including an irradiating light source disposed around said lens barrel symmetrically about the optical axis, said lens barrel further including:

(a) an optical system having a first focusing mode in which the optical system can be focusing with respect to an object lying within a predetermined distance range and a second focusing mode in which the optical system can be focusing with respect to an object lying at a distance shorter than said predetermined distance range;

(b) means for changing over said optical system between said first focusing mode and said second focusing mode;

(c) means for driving said diaphragm;

(d) means for operating said optical system for the focusing; and (e) clutch means responsive to said change-over means to operatively associate said driving means and said operating means with each other when said optical system is in said first focusing mode and to hold said aperture diameter in the vicinity of its minimum diameter and release said operative association when said optical system is in said second focusing mode.

7. A lens barrel according to claim 6, wherein said optical system includes a main focusing lens system which enables said first focusing mode and an auxiliary lens system which, when mounted on the optical axis of said main focusing lens system, is cooperable with said main focusing lens system to enable said second focusing mode, and said changeover means includes means for enabling said auxiliary lens system to be mounted on the optical axis of said main focusing lens system.

8. A lens barrel according to claim 6, wherein said clutch means includes an actuating member operatively associated with said operating means, a biasing member provided between said actuating member and said driving means for causing said driving means to follow the displacement of said actuating member, and a restraining member capable of holding said driving means in response to the change-over to said second focusing mode by said change-over means.

* * * * *